United States Patent
Di Giusto et al.

(10) Patent No.: US 10,668,836 B2
(45) Date of Patent: Jun. 2, 2020

(54) VEHICLE SEATBACK LATCH WITH REMOTE HANDLE HAVING INTEGRATED FLAG

(71) Applicant: Tesla, Inc., Palo Alto, CA (US)

(72) Inventors: Nathan Di Giusto, San Ramon, CA (US); Matthew Nayna, Mountain View, CA (US); Michael Y. Liu, Fremont, CA (US); Alejandro Valle Camillo, Livermore, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 16/020,598

(22) Filed: Jun. 27, 2018

(65) Prior Publication Data

US 2020/0001751 A1    Jan. 2, 2020

(51) Int. Cl.
*B60N 2/36* (2006.01)
*B60N 2/22* (2006.01)
*B60N 2/20* (2006.01)

(52) U.S. Cl.
CPC ............. *B60N 2/2245* (2013.01); *B60N 2/20* (2013.01)

(58) Field of Classification Search
CPC ................................ B60N 2/20; B60N 2/2245
USPC .................................................... 297/378.13
See application file for complete search history.

(56) References Cited

U.S. PATENT DOCUMENTS

| 5,664,839 | A  | * | 9/1997 | Pedronno | ........... | B60N 2/01516 |
| | | | | | | 297/378.13 |
| 6,736,461 | B2 | | 5/2004 | Blair et al. | | |
| 7,226,129 | B2 | * | 6/2007 | Brandes | ................. | B60N 2/366 |
| | | | | | | 297/378.13 X |
| 7,338,128 | B2 | * | 3/2008 | Inoue | ................... | B60N 2/3009 |
| | | | | | | 297/378.13 |
| 7,377,584 | B2 | * | 5/2008 | Griswold | ............ | B60N 2/2245 |
| | | | | | | 297/378.13 X |
| 7,404,605 | B2 | * | 7/2008 | Inoue | ..................... | B60N 2/224 |
| | | | | | | 297/378.13 X |
| 7,410,217 | B2 | * | 8/2008 | Inoue | ..................... | B60N 2/366 |
| | | | | | | 297/378.13 |
| 7,416,254 | B2 | * | 8/2008 | Jennings | ................ | B60N 2/366 |
| | | | | | | 297/378.13 X |

(Continued)

OTHER PUBLICATIONS c4owners.org http://c4owners.org/plugins/forum/forum_viewtopic.php?112957; 2010.

*Primary Examiner* — Rodney B White

(74) *Attorney, Agent, or Firm* — Knobbe Martens Olson & Bear LLP

(57) ABSTRACT

A vehicle seatback includes: a first panel; a second panel coupled to the first panel so that a welding stitching pattern is exposed, each welding stitch of the welding stitching pattern accessible from a common direction; and a bracket, wherein at least one welding stitch included in the welding stitch pattern connects the bracket to one of the first or second panels. A vehicle latch system includes: a housing at a first edge of a movable vehicle seatback with a handle to assume an extended position outside the housing in which a flag on the handle is presented, and a retracted position inside the housing in which the flag is not presented; a latch configured for placement at a second edge of the movable vehicle seatback, the second edge opposite the first edge; and a cable connecting the handle and the latch to each other.

18 Claims, 12 Drawing Sheets

(56) References Cited

U.S. PATENT DOCUMENTS

| | | | |
|---|---|---|---|
| 7,819,478 B2* | 10/2010 | Griswold | B60N 2/366 297/378.13 X |
| 8,393,682 B2* | 3/2013 | Hosoda | B60N 2/366 297/378.13 X |
| 8,408,592 B2 | 4/2013 | Hoshi | |
| 8,544,931 B2* | 10/2013 | Park | B60N 2/01583 297/378.13 X |
| 8,870,288 B2* | 10/2014 | Heeg | B60N 2/0232 297/378.13 |
| 9,238,420 B2* | 1/2016 | Seto | B60N 2/01583 |
| 10,214,124 B2* | 2/2019 | Noguchi | B60N 2/3011 |
| 2005/0023877 A1* | 2/2005 | Vermeulen | B60N 2/0232 297/378.13 |
| 2005/0194826 A1* | 9/2005 | O'Callaghan | B60N 2/01583 297/378.13 |
| 2007/0200410 A1* | 8/2007 | Inoue | B60N 2/366 297/378.13 |
| 2009/0021067 A1* | 1/2009 | Griswold | B60N 2/2245 297/378.13 |
| 2010/0109415 A1* | 5/2010 | Roszczenko | B60N 2/22 297/452.18 |
| 2011/0006576 A1* | 1/2011 | Muller | B60N 2/01583 297/378.13 |
| 2011/0006577 A1* | 1/2011 | Muller | B60N 2/01583 297/378.13 |
| 2011/0012415 A1* | 1/2011 | Muller | B60N 2/01583 297/378.13 |
| 2011/0148172 A1* | 6/2011 | Eckenroth | B60N 2/682 297/452.1 |
| 2011/0148174 A1* | 6/2011 | Eckenroth | B60N 2/682 297/452.18 |
| 2014/0117698 A1* | 5/2014 | Seto | B60N 2/01583 296/65.03 |
| 2016/0074962 A1* | 3/2016 | Koenig | B60N 2/682 297/452.19 |
| 2017/0057380 A1 | 3/2017 | Vikstrom et al. | |
| 2017/0057388 A1 | 3/2017 | Vikstrom et al. | |
| 2018/0345829 A1* | 12/2018 | Noguchi | B60N 2/3011 |
| 2019/0031068 A1* | 1/2019 | Pasternak | B60N 2/20 |

* cited by examiner

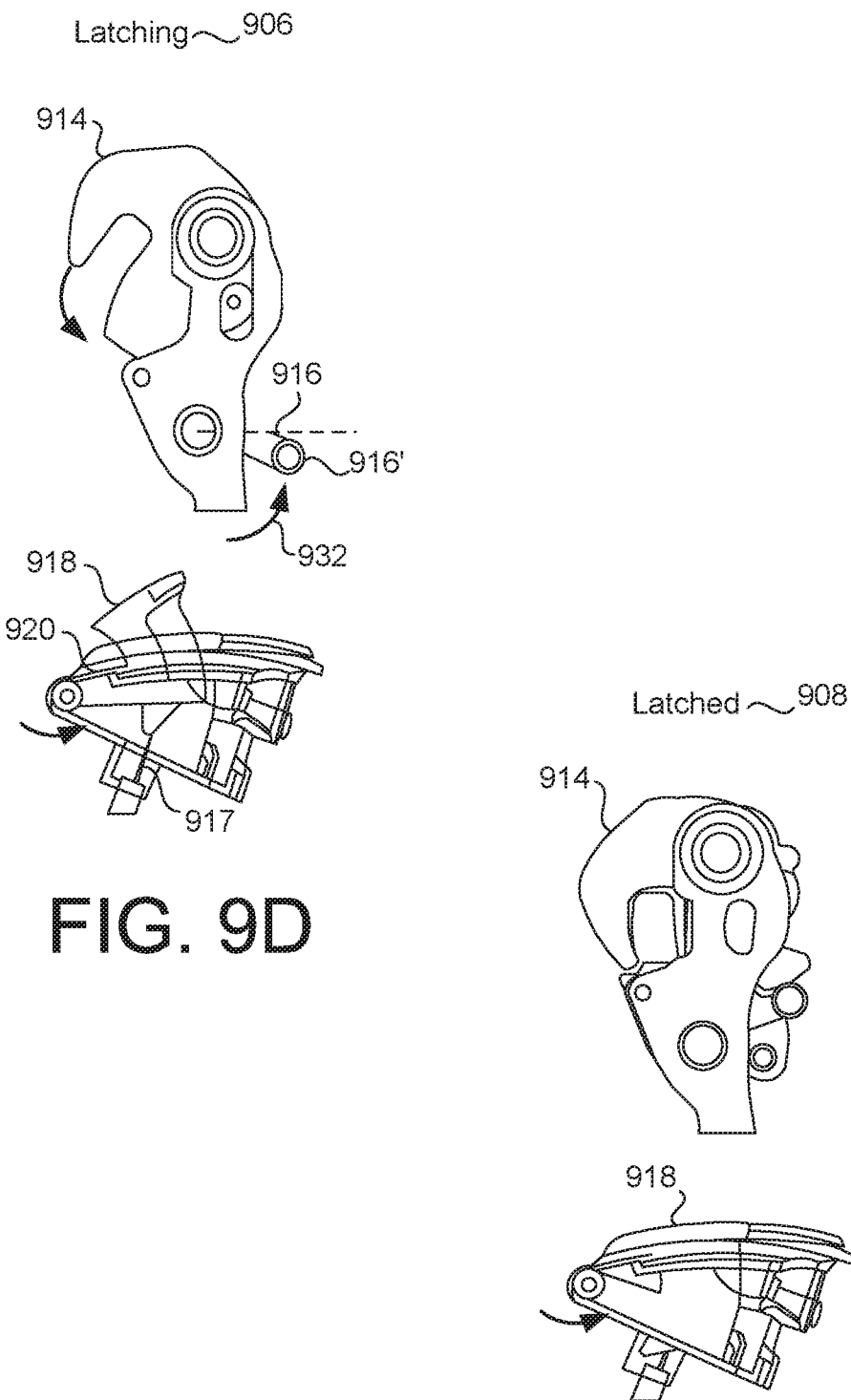

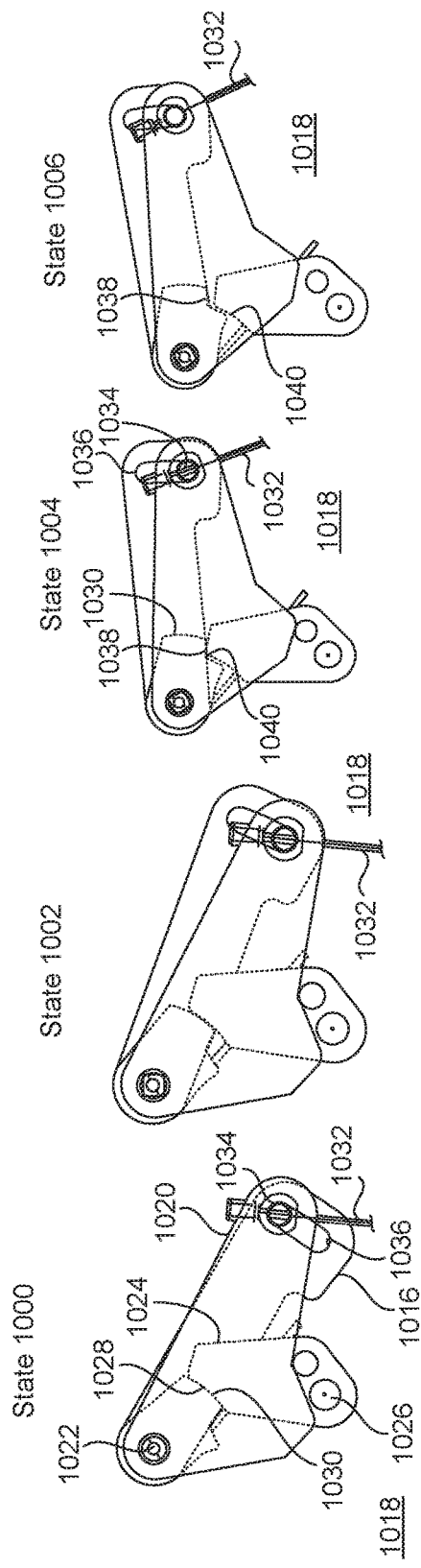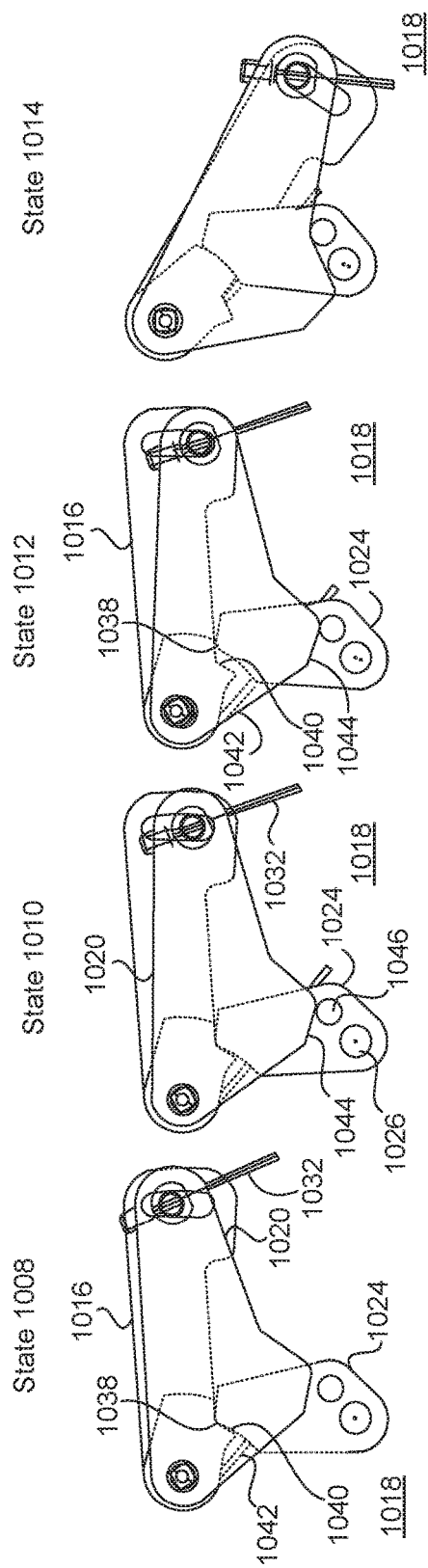

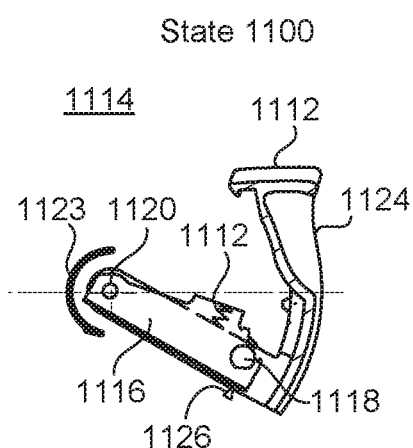
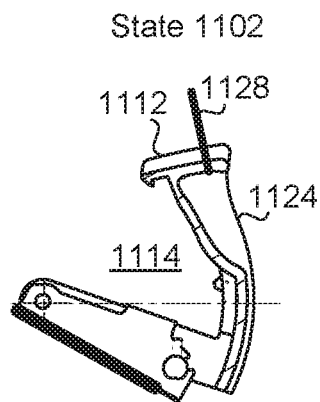
FIG. 11A  FIG. 11B
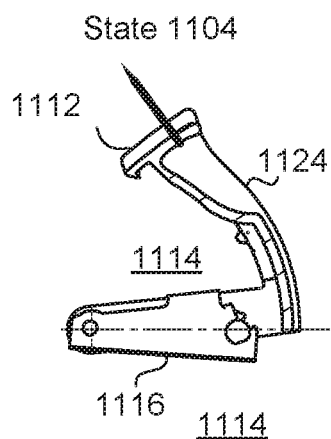
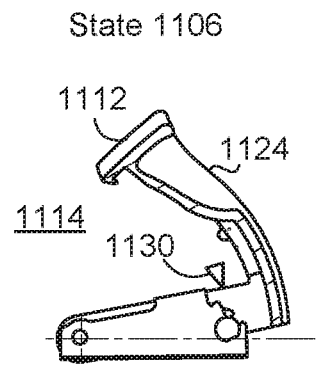
FIG. 11C  FIG. 11D

VEHICLE SEATBACK LATCH WITH REMOTE HANDLE HAVING INTEGRATED FLAG

BACKGROUND

Most vehicle seats are made of a metal frame and can be partially or fully covered with fabric and/or padding for comfort. Vehicle seatbacks, in particular, are designed to support the upper body of a passenger who is seated in the vehicle. Vehicle seatbacks have been manufactured from different materials, including steel components such as tubular frames and panels. Vehicle seatbacks have a backpanel that primarily provides support for cargo. These approaches can be associated with the disadvantages that the seatback has a high part count and/or that they have high mass. Some approaches for welding existing seatbacks are associated with the disadvantage of requiring multiple separate welding operations to be performed on each individual seatback.

Some foldable vehicle seatbacks can have a latch attached to lock the seatback in a position for occupancy. Some existing latch systems are associated with the disadvantage that the latch is positioned in a vehicle outboard location near the actuating handle, which can be a less than optimal location for structural load management. When the seatback is unlocked, a warning symbol can be visible to inform the user of the unsafe status for occupancy. Some existing latch systems are associated with the disadvantage that the warning symbol is not intuitively associated with the actuating handle, which can make the warning symbol less effective.

SUMMARY

In a first aspect, a vehicle latch system includes: a housing at a first edge of a movable vehicle seatback, the housing having a handle configured to assume at least an extended position outside the housing in which a flag on the handle is presented, and a retracted position inside the housing in which the flag is not presented; a latch configured for placement at a second edge of the movable vehicle seatback, the second edge opposite the first edge; and a cable connecting the handle and the latch to each other.

Implementations can include any or all of the following features. The handle has a profile that is essentially rectangular. A grip is formed in a first long side of the profile. The flag is integrated into a second long side of the profile opposite the first long side. The grip is formed by a top of the handle covering a hollow portion. The vehicle latch system further includes a spring that biases the handle toward the extended position. The vehicle latch system is configured to have at least latched, opening, open, and latching states. The handle assumes the extended position in the open and latching states. The handle assumes the retracted position in the latched and opening states. In the open state the latch causes the cable to slacken and the spring biases the handle into the extended position so as to present the flag. The vehicle latch system further includes a spring that biases the handle toward the retracted position. The housing further has a cam for the handle and a linkage connected to the cable. The cam is configured to lock the handle in the extended position, and wherein the linkage is configured to disengage the cam for transitioning the handle into the retracted position. The linkage includes a pin configured for engagement with a slot formed in the handle. The spring is a compression spring positioned so as to bias the handle and the linkage apart from each other. The vehicle latch system further includes a spring-loaded cam configured to lock the handle in the extended position.

In a second aspect, a vehicle seat includes: a movable vehicle seatback; and a latch system for the movable vehicle seatback, the latch system comprising: a housing at a first edge of the movable vehicle seatback, the housing having a handle configured to assume at least an extended position outside the housing in which a flag on the handle is presented, and a retracted position inside the housing in which the flag is not presented; a latch at a second edge of the movable vehicle seatback, the second edge opposite the first edge; and a cable connecting the handle and the latch to each other.

Implementations can include any or all of the following features. The vehicle latch system further includes a bracket on the movable vehicle seatback, the housing or the latch of the latch system mounted to the bracket. The movable vehicle seatback includes first and second panels connected by welding stitches in a welding stitching pattern, each welding stitch of the welding stitching pattern accessible from a common direction. The bracket is connected to the first or second panel by at least one of the welding stitches of the welding stitching pattern.

In a third aspect, a vehicle seat includes: a movable vehicle seatback; and a latch on a first edge of the movable vehicle seatback; and means, on a second edge of the movable vehicle seatback opposite the first edge, for actuating the latch, for presenting a flag, integrated with the means, when the means is in an extended position, and for hiding the flag when the means is in a retracted position.

BRIEF DESCRIPTION OF DRAWINGS

FIGS. 9A-E show states of a latch and a handle in an example latch system.

FIGS. 10A-H show states of a handle in an example handle system.

FIGS. 11A-G show states involving a handle in an example handle system.

DETAILED DESCRIPTION

This document describes examples relating to vehicle seatbacks. In some implementations, a vehicle seatback can be assembled in a welding operation that provides a simplified assembly process. For example, a main structure of the seatback can be consolidated into two relatively thin-gauge steel stamped parts (such as, but not limited to, parts having a gauge of about 0.5 mm or 0.7 mm). The structural components of the seatback can be welded together in a single operation so as to reduce cycle time. For example, such a seatback can have a lower mass and part count than those made using a conventional approach that involves welding components to a tubular frame. For example, such a seatback can have a lower profile by being assembled from panels designed to streamline the welding operation, which can improve the packaging. For example, having a backpanel of a seatback be integral into an inner panel of the seatback, and therefore integrated into the section of the part, can provide the seatback with the modulus necessary for stiffness and strength without detriment to mass. Seatbacks described herein, and seat weldments that can be used for seatbacks, can be implemented in a kinematic seat (e.g. a seat with a movable or foldable seatback), or in a static seat (e.g., a seat without a movable seatback), to name just two examples.

This document describes examples relating to a latch system for a vehicle. In some implementations, a latch system can feature a center mounted latch. For example, this can provide an efficient seat load path. In some implementations, a latch system can feature an outboard handle position. For example, this can provide an ergonomic solution for the user, who may be outside the vehicle. In some implementations, a flag can be presented on the primary motion of a handle of the latch system, the flag signaling to the user that the seatback is not locked and not safe for occupancy. For example, this can provide an intuitive user interface that draws the user's attention to the handle that was used to open the latch. In some implementations, a latch system can have a reduced number of parts compared to existing solutions. In some implementations, a latch system can be entirely mechanical. For example, this eliminates reliance on electrical contacts.

Figure 1:
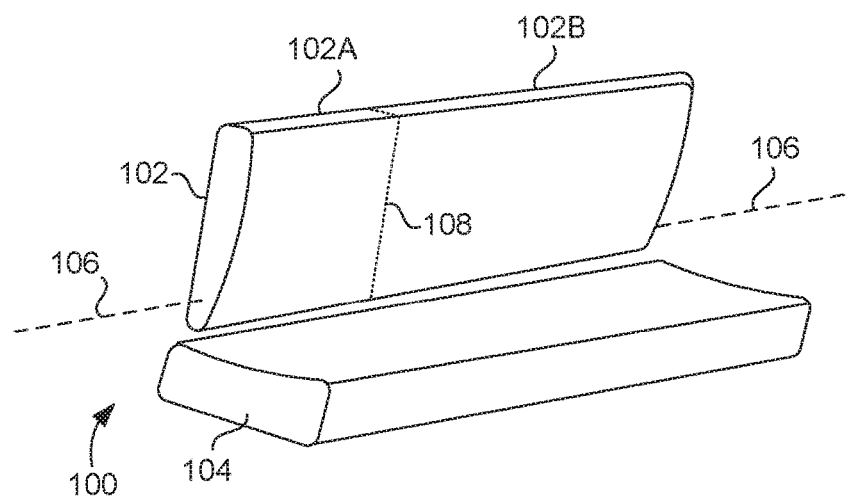
FIG. 1 shows an example of a vehicle seat.

FIG. 1 shows an example of a vehicle seat 100. The vehicle seat 100 includes at least one seatback 102 and at least one seat cushion 104. In some implementations, the vehicle seat 100 is intended to hold one or more passengers, but not a driver, of the vehicle. For example, the vehicle seat 100 can be a second-row seat, a third-row seat, and so on. The vehicle seat 100 can be a forward-facing seat or a rear-facing seat, to name just two examples.

Each of the seatback 102 and seat cushion 104 can include one or more structural components (e.g., a steel part) giving the vehicle seat 100 its overall shape and structural integrity, and one or more soft components (e.g., padding and/or upholstery) that increases user comfort and improves appearance.

The seatback 102 can be hinged relative to the seat cushion 104. Here, a rotation axis 106 is shown. In some implementations, the seatback 102 can have one or more pivot points at its lower end to facilitate rotation in either direction about the rotation axis 106. For example, this seatback 102 can be folded onto the seat cushion 104 to increase the cargo space in the vehicle, and/or to facilitate a user entering or exiting the vehicle.

The seatback 102 can be divided, as schematically indicated by a split 108, into a seatback 102A and a seatback 102B. This can facilitate different orientations of the seatbacks 102A-B with regard to each other. The seatbacks 102A-B can have any proportions, including, but not limited to, the seatback 102A comprising about 40%, and the seatback 102B about 60%, of the entire width of the vehicle seat 100. The seatback 102A can then be considered the "40" portion, and the seatback 102B the "60" portion, of a 40/60 split seat. For example, the seatback 102A and a corresponding portion of the seat cushion 104 can then hold one passenger, and the seatback 102B and a remaining portion of the seat cushion 104 can then hold two passengers. In some implementations, the split 108 can extend through the seat cushion 104 as well. For example, the seatback 102A and the corresponding portion of the seat cushion 104 can then form a fold-and-tumble seat.

Figure 2:
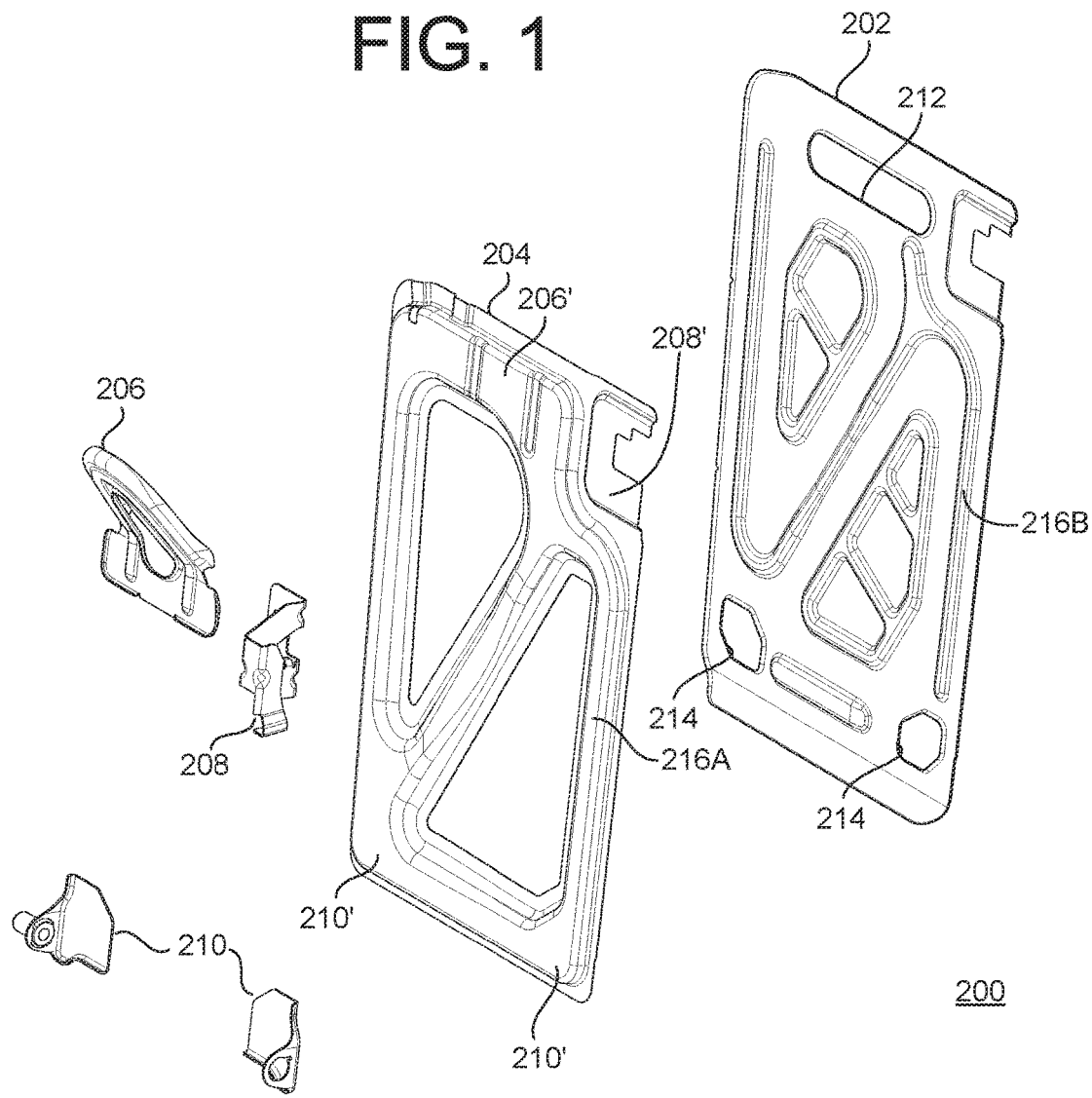
FIG. 2 shows an exploded view of an example seat weldment.

FIG. 2 shows an exploded view of an example seat weldment 200. The seat weldment 200 can include a backpanel 202, an inner panel 204, and one or more brackets, including, but not limited to, a headrest bracket 206, a latch bracket 208, and one or more (here two) pivot brackets 210. The term "inner panel" here indicates that the inner panel 204 is intended to be closer to the user than is the backpanel 202. Similarly, the term "backpanel" here indicates that the backpanel 202 is intended to be further from the user than is the inner panel 204 and provide support for cargo.

The backpanel 202 and the inner panel 204 can be made using any suitable technique. In some implementations, a stamping process is used. For example, the backpanel 202 and the inner panel 204 can be stamped from thin (including, but not limited to, 0.5 mm or 0.7 mm) steel. The headrest bracket 206, latch bracket 208, and pivot brackets 210 can be made using any suitable technique. In some implementations, a stamping process is used. One or more supplementary components of the bracket(s) can be welded onto a main stamped part. One or more brackets can be attached to an inner panel/backpanel assembly by a technique other than welding. For example, a plastic bracket can be attached using fasteners (e.g., bolts).

Supplementary brackets including but not limited to the headrest bracket 206, latch bracket 208, and pivot brackets 210 can be attached onto one or more of the backpanel 202 and the inner panel 204, such as by welding. In some implementations, the headrest bracket 206 is configured for attachment at a location 206' on the inner panel 204. For example, this can provide the structure for creating a headrest on the seat in which the seat weldment 200 is used. In some implementations, the latch bracket 208 is configured for attachment at a location 208' on the inner panel 204. For example, this can provide the structure for attaching a latch for locking the seat weldment 200 to some part of the vehicle body. In some implementations, the pivot bracket(s) 210 can be configured for attachment at one or more locations 210' on the inner panel 204. For example, this can provide the structure for hinging the seat weldment 200.

The backpanel 202 and/or the inner panel 204 can be provided with one or more openings. In some implementations, the opening(s) can allow access to all welding locations from one side of the weldment. Here, an opening 212 is provided on the backpanel 202. For example, the opening 212 can facilitate access to a welding stitch location for attaching the headrest bracket 206 and the inner panel 204 to each other at the location 206'. In some implementations, one or more openings 214 are provided on the backpanel 202. For example, the opening(s) 214 can facilitate access to a laser welding stitch location for attaching the pivot bracket(s) 210 and the inner panel 204 to each other at the location(s) 210'. Other openings can instead or additionally be provided.

Structure in the backpanel 202 and/or the inner panel 204 can provide strength or rigidity to the seat weldment 200. In some implementations, a protruding structure 216A on one side of the inner panel 204 has a corresponding recess on the opposite side of the inner panel 204. For example, the protruding structure 216A is formed by stamping. Similarly, a protruding structure 216B on one side of the backpanel 202 has a corresponding recess structure on the opposite side of the backpanel 202. For example, the protruding structure 216B is formed by stamping. In other implementations, an internal face can be used for welding, instead of, or in addition to, the protruding structures 216A and/or 216B. The recess structure of the protruding structure 216A, and the protruding structure 216B, can complement each other when the seat weldment 200 is assembled. These structures can form a box section when the backpanel 202 and the inner panel 204 are coupled to each other. In some implementations, the structures can form the box section as a cross-section profile that adds stiffness to the seat weldment 200. For example, forming the box section can be characterized as forming a tube from multiple pieces. The backpanel 202 is therefore effectively integrated into the structural cross section. For example, this can allow the backpanel 202 to serve at least the two functions of supporting cargo load and providing a structural cross section.

The seat weldment 200 can be used as a seatback for one or more persons in a vehicle seat. In some implementations, the seat weldment 200 forms the seatback for a single-person seat. For example, the single-person seat can be part of a multi-passenger seat (e.g., the "40" portion of a 40/60 split seat).

Figure 3:
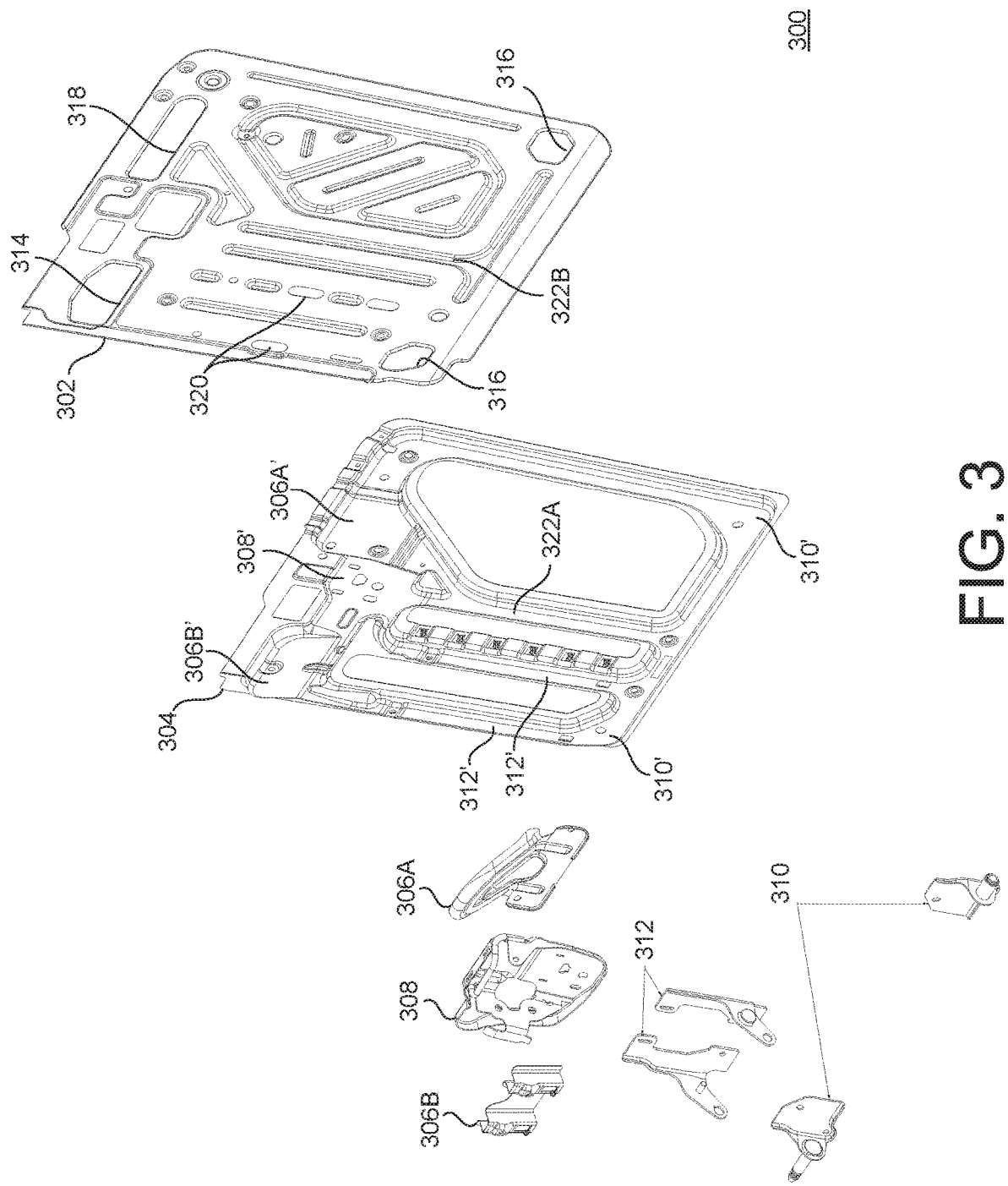
FIG. 3 shows an exploded view of another example seat weldment.

FIG. 3 shows an exploded view of another example seat weldment 300. The seat weldment 300 can include a backpanel 302, an inner panel 304, and one or more supplementary brackets, including, but not limited to, an outboard headrest bracket 306A, a center headrest bracket 306B, a retractor and latch mount bracket 308, one or more (here two) pivot brackets 310, and one or more (here two) armrest mount brackets 312. Similar to the seat weldment 200 (FIG. 2), the inner panel 304 is intended to be closer to the user, and the backpanel 302 is intended to be further from the user.

The backpanel 302 and the inner panel 304 can be made using any suitable technique, including, but not limited to, as described with regard to the seat weldment 200 (FIG. 2).

The headrest brackets 306A-B, retractor and latch mount bracket 308, pivot bracket(s) 310 and armrest mount bracket(s) 312 can be attached onto one or more of the backpanel 302 and the inner panel 304, such as by welding. In some implementations, the outboard headrest bracket 306A is configured for attachment at a location 306A' on the inner panel 304. For example, this can provide the structure for creating an outboard headrest on a seat made using the seat weldment 300. In some implementations, the center headrest bracket 306B is configured for attachment at a location 306B' on the inner panel 304. For example, this can provide the structure for creating a center headrest on the seat. In some implementations, the retractor and latch mount bracket 308 is configured for attachment at a location 308' on the inner panel 304. For example, this can provide the structure on the seat weldment 300 for attaching a seatbelt retractor for a center-seat occupant, and a latch for securing the seatback. In some implementations, the pivot bracket(s) 310 can be configured for attachment at one or more locations 310' on the inner panel 304. For example, this can provide the structure for hinging the seat weldment 300.

The backpanel 302 and/or the inner panel 304 can be provided with one or more openings. In some implementations, an opening 314 is provided on the backpanel 302. For example, the opening 314 can facilitate access to a welding stitch location for attaching the center headrest bracket 306B and the inner panel 304 to each other at the location 306B'. In some implementations, one or more openings 316 are provided on the backpanel 302. For example, the opening(s) 316 can facilitate access to a welding stitch location for attaching the pivot bracket(s) 310 and the inner panel 304 to each other at the location(s) 310'. In some implementations, one or more openings 318 are provided on the backpanel 302. For example, the opening(s) 318 can facilitate access to a welding stitch location for attaching the outboard headrest bracket 306A and the inner panel 304 to each other at the location(s) 306A'. In some implementations, one or more openings 320 are provided on the backpanel 302. For example, the opening(s) 320 can facilitate access to a welding stitch location for attaching the armrest mount bracket(s) 312 and the inner panel 304 to each other at the location(s) 312'. Other openings can instead or additionally be provided.

Structure in the backpanel 302 and/or the inner panel 304 can provide strength or rigidity to the seat weldment 300. In some implementations, a protruding structure 322A on one side of the inner panel 304 has a corresponding recess on the opposite side of the inner panel 304. For example, the protruding structure 322A is formed by stamping. Similarly, a protruding structure 322B on one side of the backpanel 302 has a corresponding recess structure on the opposite side of the backpanel 302. For example, the protruding structure 322B is formed by stamping. In other implementations, an internal face can be used for welding, instead of, or in addition to, the protruding structures 322A and/or 322B. The recess structure of the protruding structure 322A, and the protruding structure 322B, can complement each other when the seat weldment 300 is assembled. In some implementations, these structures can form a box section when the backpanel 302 and the inner panel 304 are coupled to each other. For example, the structures can form the box section as a cross-section profile that adds stiffness to the seat weldment 300.

The seat weldment 300 can be used as a seatback for one or more persons in a vehicle seat. In some implementations, the seat weldment 300 forms the seatback for a two-person seat. For example, the two-person seat can be part of a multi-passenger seat (e.g., the "60" portion of a 40/60 split seat).

FIGS. 4A-C show examples of a seatback 400. The seatback 400 can be used with, or in, any implementations described herein. For example, the seatback 400 can be the result of assembling some or all of the components of the seat weldment 300 (FIG. 3).

As illustrated in FIG. 4A, the seatback 400 can include a panel 402 (e.g., a backpanel) coupled to a panel 404 (e.g., an inner panel). In this view, the panel 404 is obscured by the panel 402 except at openings in the panel 402 (e.g., openings 406, 408 and 410). The panel 402 can be larger than the panel 404. In some implementations, the panel 402 can extend laterally further at all edges than does the panel 404. For example, this can provide some tolerance in the orientation of the panels 402 and 404 with regard to each other in a welding operation. As another example, a size difference can allow the larger panel (e.g., the panel 402) to have a rounded outer edge. This allows an edge of the larger panel to be kept away from soft-trim paddings, and having a radius at the edge of the panel can eliminate sharp edges at the seat.

The seatback 400 can include one or more supplementary brackets. In some implementations, the seatback 400 includes a headrest bracket 412 attached to the panel 404. For example, the headrest bracket 412 can be attached at a welding stitch location that is exposed through the opening 406. In some implementations, the seatback 400 includes one or more (here two) pivot brackets 414 attached to the panel 404. For example, the pivot bracket(s) 414 can be attached at one or more welding stitch locations exposed through opening(s) 415 in the panel 402. Other brackets can instead or additionally be used.

The seatback 400 forms a welding stitching pattern 416. The welding stitching pattern 416 will be used for attaching the panels 402 and 404 to each other, for attaching one or more components (e.g., the headrest bracket 412) to the panel 404, and/or for attaching one or more components to the panel 402. The welding stitching pattern 416 can include welding stitches at multiple locations. Here, a welding stitch 416A is included in an aspect of the welding stitching pattern 416 that serves to attach the peripheries of the panels 402 and 404 to each other. Here, a welding stitch 416B is included in an aspect of the welding stitching pattern 416 that surrounds a structural aspect of at least one of the panels 402 and 404. For example, such structural aspect can include a protruding structure and/or a recess structure in one or more of the panels 402 and 404. Here, welding stitches 416C are included in an aspect of the welding stitching pattern 416 that couples the headrest bracket 412 to the panel 404. Here, one or more welding stitches 416D are included in an aspect of the laser welding stitching pattern 416 to couple at least one armrest mount bracket to the panel 404. For example, the welding stitch(es) 416D can be formed at the location(s) on the panel 404 exposed by way of one or more openings 418 in the panel 402.

One or more of the panels 402 and 404 can expose the welding stitching pattern 416. Here, for example, it is the panel 404 that exposes the welding stitching pattern 416. Moreover, the welding stitching pattern 416 is exposed in a common direction. Here, the welding stitching pattern 416 is exposed in a direction perpendicular to the plane of the drawing. This makes the welding stitching pattern 416 accessible by a welding tool (e.g., a laser beam of a laser head in a laser welding apparatus) operating in an opposite direction. For example, a laser beam can here be oriented in a direction toward the drawing to reach all stitching locations of the welding stitching pattern 416, including to form each of the welding stitches 416A-D. This can allow the welding stitching pattern 416 to establish secure coupling between the panels 402 and 404, as well as between one or more components (e.g., the headrest bracket 412) and the panel 404, and/or between one or more components and the panel 402.

The welding stitching pattern 416 is an example of a feature that serves to define welding stitches in a component, each of such welding stitches accessible from a common direction. Using the above-described components as an example, the common direction can be from the panel 404 toward the panel 402, or from the panel 402 toward the panel 404.

FIG. 4B shows that one or more welding stitches 416E can be formed in the panel 402. In some implementations, the welding stitches 416E serve to couple a bracket (e.g., a retractor and latch mount bracket) to at least one of the panels 402 and 404. For example, this illustration shows a 3-thickness weld between the panel 402, the panel 404, and the supplementary bracket all at once. As such, no window may be needed to facilitate the welding.

The seatback 400 can be designed to have a low profile. FIG. 4C shows that the welding stitch 416D in the panel 404 can be exposed toward the opposite side of the panel 402 by the opening 418 in the panel 402. In some implementations, a profile depth of about 10-20 mm can be achieved. For example, the profile depth can be about 15 mm.

The above examples illustrate that a vehicle seatback (e.g., the seatback 400) can include a first panel (e.g., the panel 202, 204, 302, 304, 402 and/or 404). The vehicle seatback can include a second panel (e.g., the panel 202, 204, 302, 304, 402 and/or 404) configured to be coupled to the first panel so that a welding stitching pattern (e.g., the welding stitching pattern 416) is exposed. Each welding stitch (e.g., the welding stitches 416A-E) of the welding stitching pattern is accessible from a common direction (e.g., from the side of the panel 402 in FIG. 4A). The vehicle seatback can include a bracket (e.g., the bracket 206, 208, 210, 306A, 306B, 308 310, 312, 412, and/or 414). At least one welding stitch (e.g., the welding stitch 416C, 416D, and/or 416E) can connect the bracket to one of the first and second panels. The welding stitch can be included in the welding stitching pattern.

Some examples herein refer to laser welding. In such implementations, a laser welding stitching pattern can be formed in two or more panels, and the individual laser welding stitches of the laser welding stitching pattern can then be accessible to a laser welding apparatus (e.g., including one or more laser heads) from a common direction. Other welding techniques than laser welding that require access to only one side of the weldment can be used. For example, and without limitation, arc welding, resistance welding and/or stir friction welding can be used.

Figure 5:
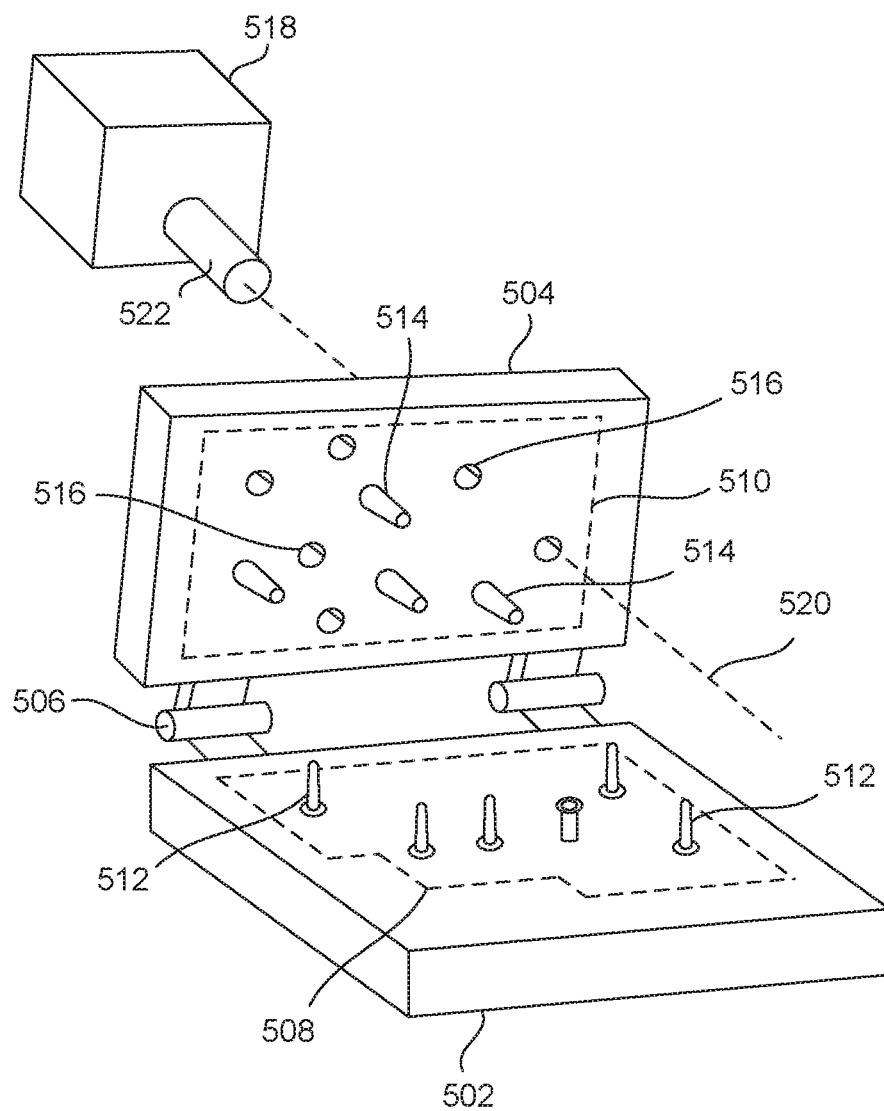
FIG. 5 shows an example of a laser welding apparatus.

FIG. 5 shows an example of a laser welding apparatus 500. The laser welding apparatus 500 can be used in any implementations described herein. For example, the laser welding apparatus 500 can be used in attaching the respective components of the seat weldments 200 and/or 300, and/or the seatback 400, to each other.

The laser welding apparatus 500 includes beds 502 and 504. In some implementations, the bed 502 can be oriented essentially horizontally and the bed 504 can then be movably positioned onto or away from the bed 502, for example by way of one or more hinge structures 506. The bed 502 can here be considered a lower bed and the bed 504 can be considered an upper bed. In another implementation, the laser welding apparatus 500 can use one or more linear guides to facilitate relative motion between the beds 502 and 504. For example, the laser welding apparatus 500 can then act like a press.

Figure 4:
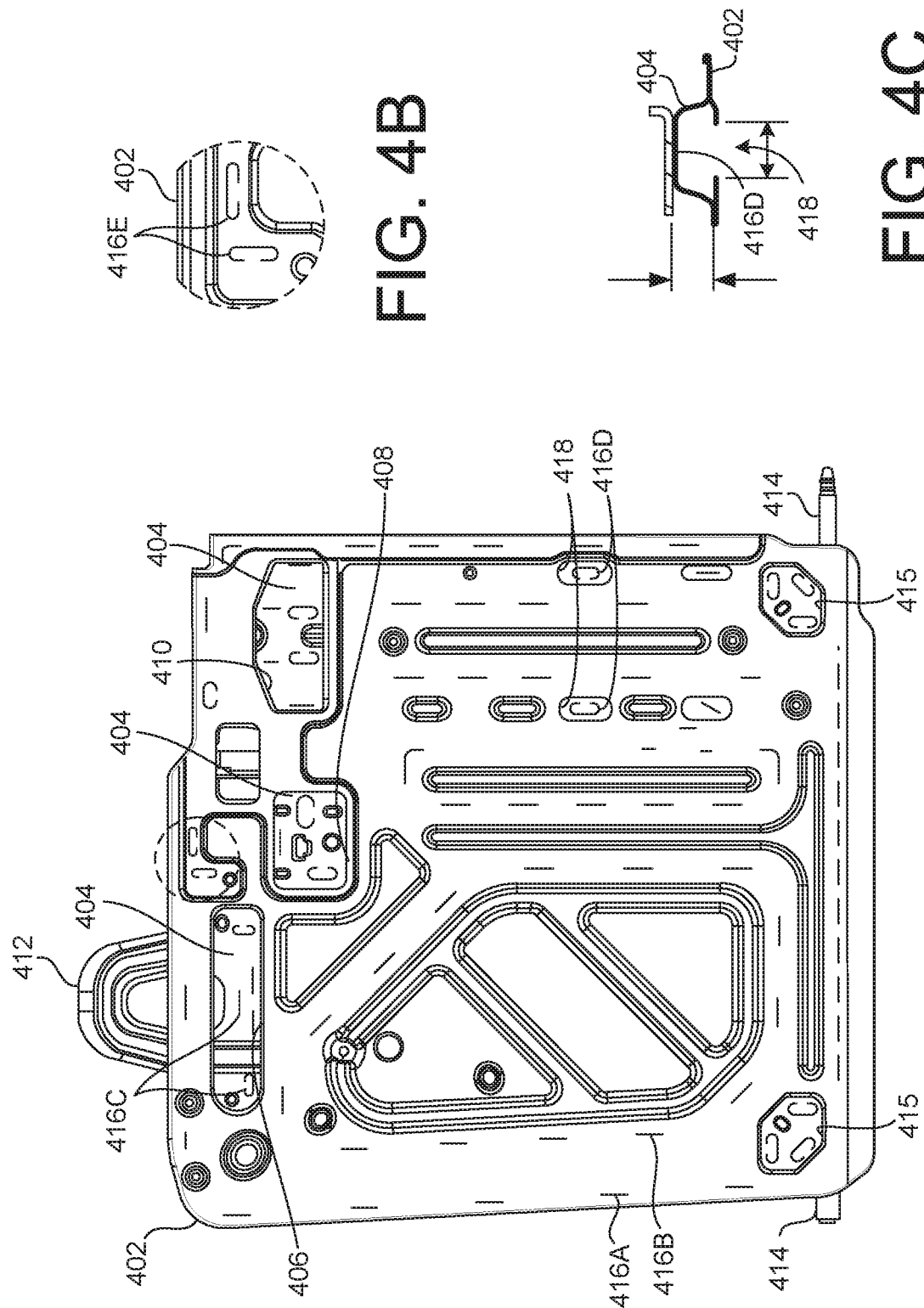
FIGS. 4A-C show examples of a seatback.

The bed 502 defines a clamping area 508 and the bed 504 defines a clamping area 510. The clamping areas 508 and 510 can define the area where two or more materials (e.g., panels and/or brackets) can be clamped together when the laser welding apparatus 500 is closed. The clamping areas 508 and 510 can have structures to facilitate clamping and/or laser welding. In some implementations, the clamping area 508 has pins 512 extending away from the bed 502 in a direction toward the bed 504 when the bed 504 is in the closed position. For example, the pins 512 can have different shapes and/or heights depending on the structure of the materials to be clamped. Similarly, the clamping area 510 has pins 514 extending away from the bed 504 in a direction toward the bed 502 when the bed 504 is in the closed position. For example, the pins 514 can have different shapes and/or heights depending on the structure of the materials to be clamped. The bed 504 can include laser channels 516 that facilitate a laser head 518 to direct one or more laser beams 520 through the bed 504. In another implementation, the laser channels 516 can instead be formed in the bed 502, and the laser head 518 can then instead operate from the other side of the laser welding apparatus 500. The number of the laser channels 516, and their respective locations, can correspond to one or more laser welding stitching patterns, including, but not limited to, the laser welding stitching pattern 416 (FIG. 4). When the bed 504 is in the closed position, the laser beam(s) 520 will be oriented in the direction toward the bed 502. The laser head 518 can be translated into different positions so as to align the laser beam 520 with respective ones of the laser channels 516. In some implementations, a projector 522 in the laser head 518 can also be moveable. For example, this can mean that the laser head 518 itself need not always be normal to the weld.

In an implementation that is not (solely) based on laser welding, one or more other welding tools can be used instead of (or in addition to) some or all of the components of the laser welding apparatus 500. For example, the laser head 518 can be replaced with (or complemented by) one or more other weld heads, including, but not limited to, a power supply and an electrode, and/or a welding torch and a gas supply.

Figure 6:
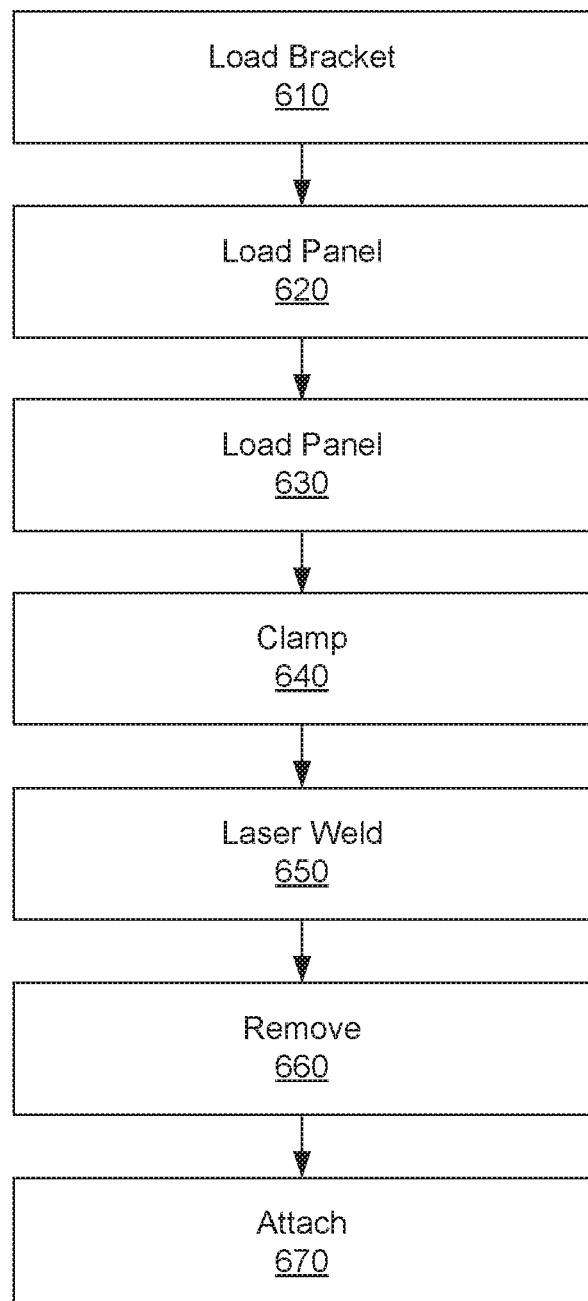
FIG. 6 shows a flowchart of an example process.

FIG. 6 shows a flowchart of an example process 600. The process 600 can be used with any implementations described herein. In some implementations, the process 600 can be used in attaching the respective components of the seat weldments 200 (FIG. 2) and/or 300 (FIG. 3), and/or the seatback 400 (FIG. 4), to each other. The process 600 can be used with laser welding and/or with other types of welding. For example, the process 600 can be performed using the laser welding apparatus 500 (FIG. 5). More or fewer operations than shown can be performed. Two or more operations can be performed in a different order.

At 610, one or more supplementary brackets can be loaded. In some implementations, the bracket(s) can be loaded onto the bed 502, within the clamping area 508. For example, one or more of the pins 512 can serve to position the bracket(s) correctly for clamping and welding.

At 620, a panel can be loaded (e.g., an inner panel). In some implementations, the panel can be loaded onto the bed 502, within the clamping area 508. This can position the panel with regard to one or more brackets on the bed 502. For example, one or more of the pins 512 can serve to position the panel correctly for clamping and welding.

At 630, a panel can be loaded (e.g., a backpanel). In some implementations, the panel can be loaded onto the bed 502, within the clamping area 508. This can position the panel with regard to one or more brackets and/or a panel on the bed 502. For example, one or more of the pins 512 can serve to position the panel correctly for clamping and welding.

In the example described above, loading of the supplementary bracket(s) takes place first, thereafter the loading of an inner panel, and finally the loading of a backpanel. For example, the backpanel can be larger than the inner panel. For example, loading of the backpanel can include aligning an opening in the backpanel with one or more welding stitching locations on the inner panel. For example, loading of the backpanel can include aligning a welding stitching location on the backpanel with one or more brackets by way of an opening in the inner panel. In other implementations, loading of the backpanel can take place first, thereafter the inner panel and finally the supplementary bracket(s).

The loading of the supplementary bracket(s) and the panels can facilitate that a welding stitching pattern is exposed. In some implementations, the welding stitching pattern 416 (FIG. 4) can be exposed toward the bed 504 (FIG. 5) when the bed 504 is in the closed position (e.g., exposed upward in this view). For example, this can expose the welding stitching pattern toward a welding source (e.g., the laser head 518).

At 640, beds can be clamped toward each other. In some implementations, the bed 504 is moved toward the bed 502 by way of the hinge structure 506. For example, pneumatic, hydraulic and/or electric power can be used to effectuate the clamping together of the beds 502 and 504. In the clamping, the pins 512 and 514 can bear against respective materials (e.g., panels and/or brackets) to ensure that a good quality stack is formed of the material to be welded together.

At 650, welding can be performed. In some implementations, the laser head 518 performs all of the laser welding stitches (including, but not limited to, the welding stitches 416A-E) of a laser welding stitching pattern in a single operation. The laser head 518 can operate in essentially a common direction during the process, and direct the laser beam 520 through corresponding ones of the laser channels 516 to effectuate the laser welding stitching pattern. This is facilitated because the materials to be welded are arranged so that the welding stitching pattern is exposed in a common direction.

At 660, the welded product can be removed from the welding apparatus. In some implementations, this concludes the operation on that particular product in the welding apparatus. For example, the process can then start over (e.g., at 610) with the loading of materials for another welding operation.

At 670, one or more additional operations can be performed with regard to the welded product. In some implementations, one or more components are attached to the welded product. For example, a latch can be bolted onto the welded product using a latch bracket.

The process 600 illustrates that a method can be performed that includes placing a bracket (e.g., the bracket 206, 208, 210, 306A, 306B, 308, 310, 312, 412, and/or 414) in a welding apparatus (e.g., the laser welding apparatus 500) that includes first and second beds (e.g., the beds 502 and 504) of clamping pins (e.g., the pins 512 and 514). The method can include placing a first seatback panel (e.g., the panel 202, 204, 302, 304, 402 and/or 404) in the welding apparatus. The method can include placing a second seatback panel (e.g., the panel 202, 204, 302, 304, 402 and/or 404) in the welding apparatus. The bracket and the first and second seatback panels can be aligned so that a welding stitching pattern (e.g., the welding stitching pattern 416) is exposed. Each welding stitch (e.g., the welding stitch 416A, 416B, 416C, 416D, and/or 416E) of the welding stitching pattern can be accessible from a common direction (e.g., through some or all of the laser channels 516). The method can include clamping, using the first and second beds of clamping pins in the welding apparatus, the bracket and the first and second seatback panels to form a stack. The method can include welding, according to the welding stitching pattern, the stack using a weld head (e.g., the laser head 518) that operates in the common direction.

The above examples have related primarily to seatbacks. The following examples relate primarily to vehicle latch systems. In some implementations, a latch system described herein can be used on one or more of the seatbacks described herein.

Figure 7:
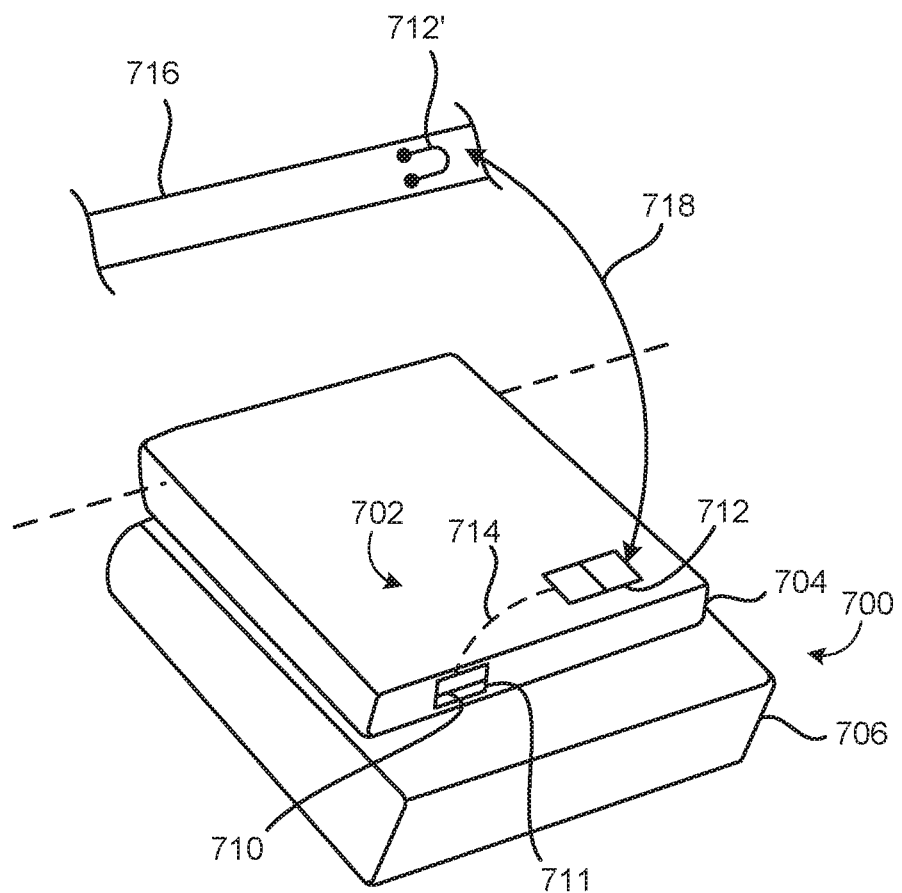
FIG. 7 shows an example of a vehicle seat with a latch system.

FIG. 7 shows an example of a vehicle seat 700 with a latch system 702. The vehicle seat 700 includes a seatback 704 and a seat cushion 706. The seatback 704 can be rotatable with regard to the seat cushion 706 about a rotation axis 708. Currently, the seatback 704 is folded onto the seat cushion 706.

The latch system 702 includes a handle 710 in a housing 711, and a latch 712 operatively connected to each other by a flexible cable 714 schematically shown. For example, the flexible cable 714 can include a Bowden cable. In some implementations, the latch 712 is configured to selectively lock onto a striker wire 712', which can be attached to vehicle structure 716 which is only partially shown. The vehicle structure 716 is part of the body of the vehicle in which the vehicle seat 700 and the latch system 702 are located. For example, the vehicle structure 716 can include a parcel shelf of the vehicle body. The possible movement up and down of the seatback 704 is here indicated by an arrow 718.

When the seatback 704 is in the upright position as indicated by the arrow 718, the striker wire 712' can be locked to the latch 712. This serves to maintain the seatback 704 in the upright position. The handle 710 can be used for unlocking the latch 712 and the striker wire 712' from each other. This can allow the seatback 704 to assume the shown position. The handle 710 is positioned in a visible location on the vehicle seat 700, for example near or on the top of the seatback 704. When the striker wire 712' is unlocked from the latch 712 the handle 710 can present a flag to the user. The flag can alert the user to the fact that the seatback 704 is not locked and not safe for occupancy. The handle 710 can have at least an extended position where the flag is presented, and a retracted position where the flag is not presented.

Here, the handle 710 and the latch 712 are placed at respective opposite sides of the seatback 704. In some implementations, this can facilitate a central placement of the latch 712 in the vehicle (e.g., inboard on the vehicle seat 700) while allowing the handle 710 to be placed in an ergonomically favorable position for operation by a user (e.g., outboard on the vehicle seat 700). For example, placing the latch 712 at an inboard edge of the seatback 704 can position the latch 712 closer to where the seatback 704 may usually be subjected to greater loads.

In the above example, the latch system 702 is mounted on the vehicle seat 700, and the striker wire 712' is mounted on the body of the vehicle (e.g., on the vehicle structure 716). This can be characterized as an "on-seat" configuration of the latch system 702. Other configurations can be used. In some implementations, the latch system 702 (including the handle 710, the housing 711, the latch 712 and the cable 714) can be placed on the body of the vehicle (e.g., on the vehicle structure 716), and the striker wire 712' can be mounted on the seatback 704. Doing so can facilitate functionality similar to that described in the above example, and can provide similar advantages with regard to latch placement and ergonomics. This approach can be characterized as an "on-body" configuration of the latch system 702. In both the on-seat and the on-body configuration, the handle 710 can be positioned at a first edge of the seatback 704: In the on-seat configuration the handle 710 is mounted onto the seatback 704, and in the on-body configuration the handle 710 can be mounted on the vehicle structure 716 so as to be adjacent the first edge when the seatback 704 is in the locked position. In both the on-seat and the on-body configuration, the latch 712 can be positioned at a second edge of the seatback 704: In the on-seat configuration the latch 712 is mounted onto the seatback 704, and in the on-body configuration the latch 712 can be mounted on the vehicle structure 716 so as to be adjacent the second edge when the seatback 704 is in the locked position.

The above examples illustrate that a vehicle seat (e.g., the vehicle seat 700) can include a movable vehicle seatback (e.g., the seatback 704) and a latch system (e.g., the latch system 702) for the movable vehicle seatback. The latch system can include a housing (e.g., the housing 711) at a first edge of the movable vehicle seatback, the housing having a handle (e.g., the handle 710). The handle can be configured to assume at least an extended position outside the housing (e.g., the when the latch 712 is unlocked) in which a flag on the handle is presented, and a retracted position inside the housing (e.g., when the latch 712 is locked to the striker wire 712') in which the flag is not presented. The latch system can include a latch (e.g., the latch 712) at a second edge of the movable vehicle seatback, the second edge opposite the first edge. The latch system can include a cable (e.g., the cable 714) connecting the handle and the latch to each other.

The latch system 702 can be used in a multi-passenger seat. In some implementations, each of the seatbacks 102A and 102B (FIG. 1) of the seat 100 can be provided with a respective instance of the latch system 702. For example, two of the striker wires 712' can then be positioned centrally in the vehicle (e.g., on the vehicle structure 716).

Figure 8:
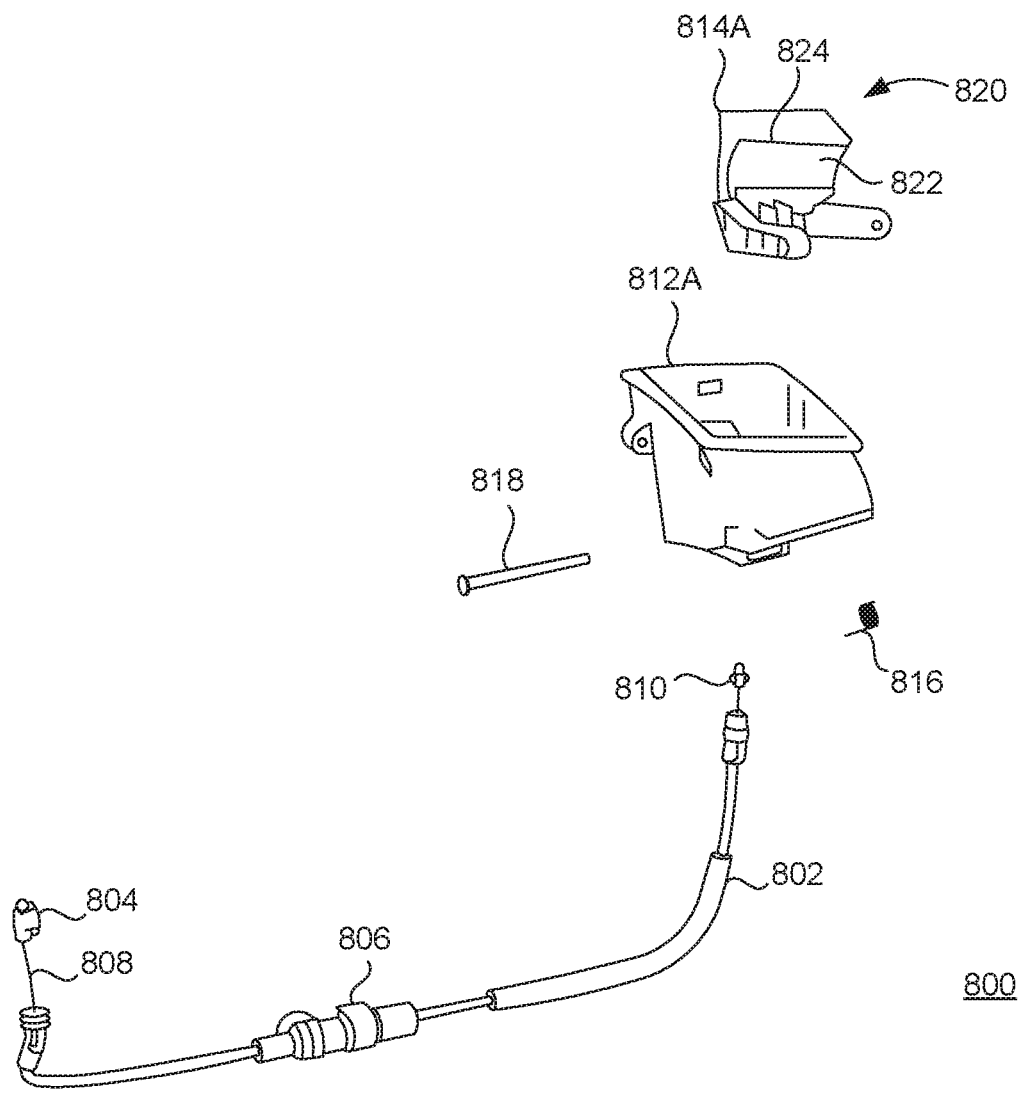
FIG. 8 shows an example of a handle system.
Figure 9A:
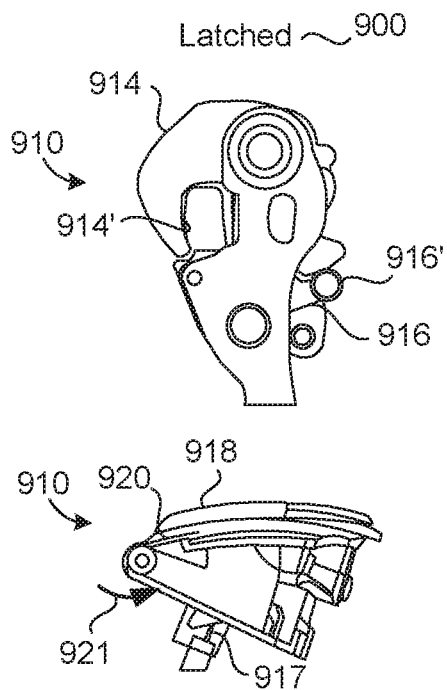
Figure 9B:
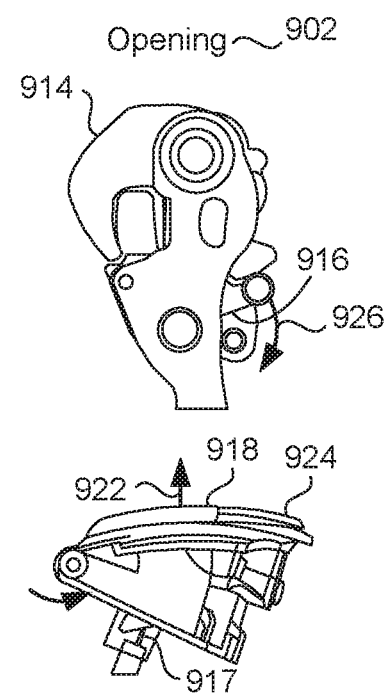
Figure 9C:
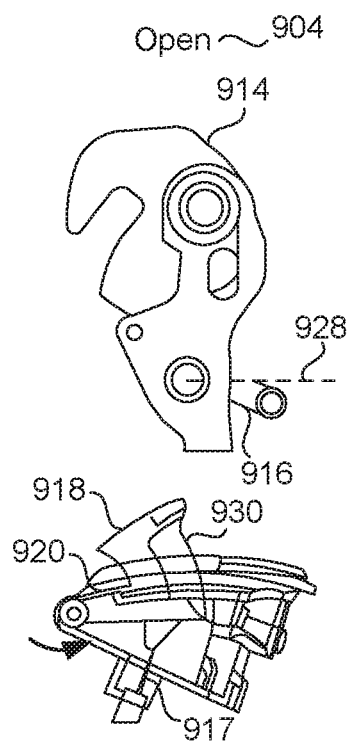

FIG. 8 shows an example of a handle system 800. The handle system 800 can be used with any implementations described herein. For example, the handle system 800 can be implemented in a vehicle, such as on a seatback, to provide for actuation of a latch and presentation or hiding of a flag representing a locked status of the latch.

The handle system 800 includes a flexible cable system 802 with an end 804 configured for actuation of a latch (not shown). The flexible cable system 802 can include a cable adjuster 806 and a cable 808 extending between the end 804 and another end 810. The cable adjuster 806 can be used to set the correct length of the cable 808. This can implicate craftsmanship aspects regarding the flexible cable system 802. For example, if different instances of the cable 808 tend to vary somewhat in length compared to each other, the cable adjuster 806 may need to be used (e.g., after the flexible cable system 802 is installed) to ensure quality operation of the handle system 800.

The handle system 800 includes a housing 812 associated with a handle 814, a handle spring 816, and a pivot pin 818. These components can be combined into an assembly configured for attachment to the end 810 of the cable 808. The handle 814 can then be used for actuating (here, unlatching) the latch connected to the end 804 of the cable 808. This can disengage a seatback from a locked position so that the seatback can be inclined or reclined.

A flag 820 is integrated on the handle 814. The flag 820 is obscured by the handle 814 in this view. The handle 814 can rotate about the pivot pin 818 to assume any of multiple positions. The handle 814 can assume a retracted position where the handle 814 is substantially inside of the housing 812, and a top 814A of the handle 814 is essentially flush with a top 812A of the housing 812. In this retracted position, the flag 820 can be hidden from a user's view. The handle 814 can assume an extended position where a substantial portion of the handle 814 is outside of the housing 812. The handle spring 816 can bias the handle 814 toward the extended position. In the extended position, the flag 820 can be presented so as to be visible to a user. For example, in the extended position at least so much of the handle 814 can be outside of the housing (above the top 812A) to allow essentially the entire flag 820 to be seen. The flag 820 can be positioned on either or both sides of the handle 814. For example, the flag 820 can be placed on the side of the handle 814 that will be facing upward when the handle 814 is in the extended position.

In some implementations, the handle 814 has a profile (e.g., near the top 814A) that is essentially rectangular. A grip 822 can be formed in the handle 814. In some implementations, the grip 822 is formed by the top 814A covering a hollow portion (e.g., a recess) in the handle 814. For example, the grip 822 can provide room for one or more fingers of a user's hand to actuate the handle 814. Here, the grip 822 is formed in a first long side 824 of the profile of the handle 814. The flag 820, moreover, can be integrated into a second long side 826 of the profile of the handle 814. Here, the first and second long sides 824 and 826 are opposite each other.

The handle 814 and the housing 812 can be made of a synthetic material, including, but not limited to, a polymer material. For example, the handle 814 and/or the housing 812 can be formed by an injection molding process. The flag 820 can be integrated into the handle 814 in any suitable way. In some implementations, an overmolding process can be used. As another example, the flag 820 can be printed on the handle 814, or mounted onto the handle 814 by way of snapping into the handle 814, or using a fastener and/or an adhesive. In some implementations, the flag 820 has a contrasting color compared to the handle 814 and the housing 812. For example, the flag 820 can be safety red similar to colors used on restraints.

The above example illustrates that a vehicle latch system (e.g., the handle system 800 provided with a latch) can include a housing (e.g., the housing 812) at a first edge of a movable vehicle seatback (e.g., the seatback 704 in FIG. 7). The housing can have a handle (e.g., the handle 814) configured to assume at least an extended position outside the housing in which a flag (e.g., the flag 820) on the handle is presented, and a retracted position in which the flag is not presented. The latch system can include a latch configured for placement at a second edge of the movable vehicle seatback, the second edge opposite the first edge. The vehicle latch system can include a cable (e.g., the cable 808) connecting the handle and the latch to each other.

As indicated, the handle system 800 can be mounted to a seatback, including, but not limited to, any of the seatbacks described herein. A latch bracket (e.g., the latch bracket 208 (FIG. 2) and/or the retractor and latch mount bracket 308 (FIG. 3) can be used for attaching the handle system 800. The housing 812 can be mounted to a seatback, including, but not limited to, the seatbacks formed from the seat weldments 200 (FIG. 2) and/or 300 (FIG. 3), or to the seatback 400 (FIG. 4). Such a mounting of the handle system 800 can benefit from an improved process of assembling such a seatback, for example in the beneficial way that one or more brackets can be coupled to the seatback in the same welding operation as when the inner panel and backpanel are attached to each other.

The handle 814 can serve to actuate the latch (e.g., by the user pulling on the handle 814), so as to unlock the latch. The handle 814 can serve to present the flag 820, which is integrated with the handle 814, outside the housing 812 when the handle 814 is in the extended position. The handle 814 can serve to hide the flag 820 inside the housing 812 when the handle 814 is in the retracted position.

FIGS. 9A-E show states 900-908 of a latch 910 and a handle side 912 in an example latch system. The state 900 can be considered a latched state; the state 902 can be considered an opening state; the state 904 can be considered an open state; the state 906 can be considered a latching state; and the state 908, similar or identical to the state 900, can be considered a latched state.

In the latched state 900, a hook 914 on the latch 910 is down. For example, this can signify that a striker wire (not shown) has been captured inside a mouth 914' of the hook 914. A cam 916 of the latch is here up (e.g., engaged). In some implementations, the cam 916 being up can signify that a cable 917, extending between the latch 910 and the handle side 912 and attached at an end 916' of the cam 916, has been advanced in a direction toward the latch 910 and away from the handle side 912. For example, advancement of the cable 917 in such a direction can assure that a handle 918 at the handle side 912 is down. This can be considered a retracted position of the handle 918. A spring 920 on the handle side 912 can bias the handle 918, as indicated by an arrow 921, toward an extended position. However, in the latched state 900, the tension in the cable 917 maintains the handle 918 in the retracted position.

In the opening state 902, a user is applying a force 922 to the handle 918. This can serve to advance the handle 918 out of a housing 924 at the handle side 912. The advancement of the cable 917 toward the handle side 912 here serves to pull the cam 916 down (e.g., disengaging the cam 916) on the latch 910 as illustrated by an arrow 926.

In the open state 904, the cam 916 has passed a limit 928 where rotation of the hook 914 becomes possible. Opening of the hook 914 corresponds to the latch 910 and the striker wire (not shown) no longer being locked together. As such, the seatback can be moved when the latch system is in the open state 904. The handle 918 remains in the extended position in the open state 904, and a flag 930 integrated with the handle 918 is presented. For example, the latch 910 can cause the cable 917 to slacken, and the spring 920 can bias the handle 918 into the extended position so as to present the flag 930. A user can depress the handle 918 in the open state 904, and the spring 920 can then return the handle 918 to the extended position. In the open state 904, the cam 916 can lock against movement of the cable 917 towards the latch 910.

In the latching state 906, the striker wire (not shown) rotates the hook 914 and re-engages the cam 916. Raising the cam 916 as indicated by an arrow 932 is then facilitated. Initially during the latching state 906, the handle 918 remains in the extended position. The latch 910 pulls on the cable 917 via its attachment at the end 916'. The cable 917 pulls down the handle 918 against the bias of the spring 920.

In the latched state 908, the hook 914 is down, and the handle 918 is in the retracted position. As such, the flag 930 is hidden (not presented) in the latched state 908.

The handle 918 can serve to actuate the latch 910 (e.g., by the user pulling on the handle 918), so as to unlock the latch 910. The handle 918 can serve to present the flag 930, which is integrated with the handle 918, outside the housing 924 when the handle 918 is in the extended position. The handle 918 can serve to hide the flag 930 inside the housing 924 when the handle 918 is in the retracted position.

A vehicle latch system having the latch 910 and the handle side 912 can use a cable adjuster (e.g., the cable adjuster 806 in FIG. 8) to ensure that the cable 917 has a proper fit by making adjustments to shorten or lengthen the cable 917. Other implementations can operate to satisfaction also without the benefit of a cable adjuster, for example as will be described in the following.

FIGS. 10A-H show states 1000-1014 of a handle 1016 in an example handle system 1018. The handle system 1018 includes a linkage 1020 that has a common pivot point 1022 with the handle 1016. The linkage 1020 is shown partially transparent for clarity. In the following descriptions nominal angles of the handle 1016 and/or the linkage 1020 will be described. Such angles can be defined with regard to an arbitrary reference, such as an axis that aligns with the handle 1016 and the linkage 1020 in the state 1000. The handle system 1018 can be used in any implementations described herein, including, but not limited to, in the vehicle seat 700 in FIG. 7.

The state 1000 can be considered a "handle full down" state. In the state 1000 the handle 1016 and the linkage 1020 can both have an angle of 0. A cam 1024 rotatable about a pivot point 1026 has a surface 1028 that currently meets a surface 1030 on the handle 1016. The cam 1024 is not engaged in the state 1000. A cable 1032 is coupled to the linkage 1020, which has a pin 1034. The handle 1016 has a slot 1036 within which the pin 1034 is moveable. The handle 1016 has a loss motion fitting to the cable 1032. The handle system 1018 can therefore ensure that the handle 1016 is full-down in the state 1000, even if the length of the cable 1032 varies (e.g., increases).

It is assumed that a user applies a lifting force on the handle 1016 in the state 1000, and the handle system 1018 can then assume the state 1002. The state 1002 can be considered a "free play removed" state. In the states 1000 and 1002, there is no cable stroke and the linkage is moving in the slot 1036 of the handle 1016. In the state 1002, the handle 1016 can have an angle of, say, about 10 degrees. The angle of the handle in the state 1002 can be arbitrarily defined, including, but not limited to, to be an angle of about 5-10 degrees in order to accommodate for variance in length of the cable 1032. The linkage 1020 can have an angle of 0 in the state 1002. The cam 1024 is not engaged in the state 1002.

It is assumed that the user continues to apply the lifting force on the handle 1016 in the state 1002, and the handle system 1018 can then assume the state 1004. The state 1004 can be considered a "latch lock on, cam lock on" state. The travel between the states 1002 and 1004 includes cable stroke. In some implementations, the state 1004 occurs when the handle 1016 has added a particular angle to the orientation the handle 1016 had in the state 1004, including, but not limited to about a 25 degree angle, as corresponds to the travel of the cable 1032 required to disengage a latch-side cam (not shown). For example, if the angle of the handle 1016 in the state 1002 was 10 degrees, then in the state 1004 the handle 1016 can have an angle of about 10+25=35 degrees. In such an example, the linkage 1020 can have an angle of about 25 degrees, due to one end of the slot 1036 engaging with the pin 1034. The rotation of the linkage 1020 pulls the cable 1032 towards the handle system 1018—here, away from a latch (not shown), thereby opening the latch.

In the state 1004, the cam 1024 is engaged. In some implementations, the cam 1024 has a cusp 1038 that can provide the engagement. For example, the cusp 1038 has here cleared the surface 1030 of the handle 1016, and entered a recess 1040 in the surface 1030. The handle 1016 is now in an extended position. For example, this can correspond to a presentation of a flag (not shown) integrated with the handle 1016.

It is assumed that the user continues to apply the lifting force on the handle 1016 in the state 1004, and the handle system 1018 can then assume the state 1006. The cable 1032 continues to travel between the states 1004 and 1006. The state 1006 can be considered a "handle hits housing stoppers" state. For example, the handle system 1018 can be implemented within a housing (e.g., the housing 812 in FIG. 8) that provides one or more stoppers for handle travel. In the state 1006, the handle 1016 can reach its full travel. In some implementations, the handle 1016 can have an angle of about 40 degrees in the state 1006. The linkage 1020 can have an angle in the state 1006 that is a fixed number of degrees less than that of the handle 1016. In some implementations, the linkage 1020 can have an angle of about 40−10=30 degrees. For example, this can be considered a full travel for the linkage 1020. A small gap exists between the cusp 1038 and the recess 1040.

It is assumed that the user ceases to apply a lifting force to the handle 1016 in the state 1006, and the handle system 1018 can then assume the state 1008. The state 1008 can be considered a "handle at rest in open position" state. Due to the loss motion fitting, the cable 1032 does not move between the states 1006 and 1008. A spring 1042 biases the handle 1016 to a position where the cusp 1038 meets the recess 1040. This can be characterized as the handle 1016 being sprung back to hit the cam 1024. The handle 1016 can have an angle of, say, about 34 degrees in the state 1008. The linkage 1020 can have an angle of, say, about 30 degrees in the state 1008. The cam 1024 is engaged in the state 1008.

It is assumed that the latch (not shown) begins closing when the handle system 1018 is in the state 1008. For example, this can occur when a striker wire rotates a hook of the latch, causing the latch to begin closing. This can in turn cause the latch to pull on the cable 1032 in a direction away from the handle system 1018. The handle system 1018 can then enter the state 1010, which can be considered a "cable return part 1, where the linkage touches the cam" state. The handle 1016 can have an angle of, say, about 34 degrees in the state 1010. The linkage 1020 can have an angle of, say, about 26 degrees in the state 1010. The cam 1024 remains engaged in the state 1010, but a surface 1044 of the linkage 1020 is engaging a pin 1046 on the cam 1024, causing the cam 1024 to begin rotating about the pivot point 1026.

It is assumed that the closing of the latch continues in the state 1010, and the handle system 1018 can then enter the state 1012, which can be considered a "linkage disengages cam" state. The handle 1016 can have an angle of, say, about 34 degrees in the state 1012. The linkage 1020 can have an angle of, say, about 26−2=24 degrees in the state 1012. The surface 1044 has rotated the cam 1024 so that the cusp 1038 clears (or is just about to clear) the recess 1040 in the surface 1030. The cam 1024 is therefore disengaged in the state 1012.

The disengagement of the cam 1024 in the state 1012 allows the spring 1042 to begin returning the handle 1016 toward its original position. This brings the handle system 1018 into the state 1014, which can be considered a "handle spring pushes all down to start" state. The handle 1016 and the linkage 1020 can both have an angle of, say, about 0 degrees in the state 1014. The cam 1024 is not engaged in the state 1014. As such, the state 1014 can be considered the same state as the state 1000.

The handle system 1018 is an example of a vehicle latch system having a spring (e.g., the spring 1042) that biases a handle (e.g., the handle 1016) toward a retracted position (e.g., the position in the states 1000 and 1014). The handle system 1018 is an example of a vehicle latch system having a cam (e.g., the cam 1024) for a handle (e.g., the handle 1016) and a linkage (e.g., the linkage 1020) connected to a cable (e.g., the cable 1032). The handle system 1018 is a example of a vehicle latch system where a cam (e.g., the cam 1024) is configured to lock a handle (e.g., the handle 1016) in an extended position (e.g., the position in the state 1008), and wherein a linkage (e.g., the linkage 1020) is configured to disengage the cam (e.g., by way of the surface 1044 acting on the pin 1046 of the cam 1024) for transitioning the handle into a retracted position (e.g., the position in the states 1000 and 1014). The handle system 1018 is an example of a vehicle latch system having a linkage (e.g., the linkage 1020) that includes a pin (e.g., the pin 1034) configured for engagement with a slot (e.g., the slot 1036) formed in a handle (e.g., the handle 1016).

The handle 1016 can serve to actuate the latch (e.g., by the user pulling on the handle 1016), so as to unlock the latch. The handle 1016 can serve to present a flag, integrated with the handle 1016, when the handle 1016 is in the extended position. The handle 1016 can serve to hide the flag when the handle 1016 is in the retracted position.

FIGS. 11A-G show states 1100-1112 involving a handle 1112 in an example handle system 1114. A linkage 1116 is attached to a cable (not shown) by a pin 1118, the cable extending to a latch. The pin 1118 has a loss motion fitting to the cable. The linkage 1116 is shown partially transparent for clarity. The handle 1112 and the linkage 1116 share a common pivot point 1120. The handle 1112 and the linkage 1116 are joined to each other only by a spring 1122 (here, a compression spring) that serves to bias the handle 1112 and the linkage 1116 apart from each other, force the handle 1112 onto an end stop 1126, and hide a flag 1124 that is positioned on the handle 1112. The force of the spring can be referred to as F_linkage. The handle 1112 has a torsion spring supplying a force F_handle 1123 that tends to lift the handle 1112 (i.e., to bias the handle 1112 toward an extended position). The relationship between F_linkage and the F_handle 1123 can be that F_linkage>F_handle. The spring 1122 can serve to pull any tolerance (e.g., excess length) out of the cable length while keeping the handle 1112 in the down-most position when latched. In this example, the stroke of the spring 1122 shall be greater than the variance in cable length.

In the state 1100, the flag 1124 integrated with the handle 1112 is not presented. For example, this is because the position of the handle 1112 is such that the flag 1124 is hidden within some structure (e.g., within a housing). The spring 1122 currently pushes the handle down on the handle end stop 1126. The latch is locked.

In the state 1102, a user applies a force (F_customer) 1128 on the handle 1112. This causes an initial motion of the handle 1112. For example, the flag 1124 can be partially presented in the state 1102. There is no motion in the cable in the state 1102. The spring 1122 may be at its solid height (i.e., fully compressed) in the state 1102, or arbitrary stoppers (not shown) can be used in the linkage that bottom out on the handle 1112 before the spring 1122 reaches its solid height. In the present view of the state 1102, the spring 1112 is not visible.

In the state 1104, the handle 1112 has raised the linkage 1116 to a point where the cable has opened the latch. For example, the cable stroke can be sufficient to unlock the latch. Accordingly, the latch is off in the state 1104. The flag 1124 is presented in the state 1104. The spring 1122 is at its solid height (i.e., fully compressed) and is not visible in the present view of the state 1104.

In the state 1106, the handle 1112 is at a full overstroke. The flag 1124 is presented in the state 1106. The handle 1112 can hit an end stop 1130 (e.g., on the housing) in the state 1106 and may not be able to travel further in that direction. The spring 1122 is at its solid height (i.e., fully compressed) and is not visible in the present view of the state 1106.

In the state 1108, the handle 1112 is resting open. The flag 1124 is presented in the state 1108. The position of the linkage 1116 is set by the cable length. The spring 1122 pushes the handle 1112 down to an equilibrium position.

Figure 11E:
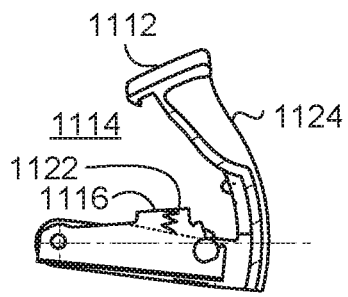
Figure 11F:
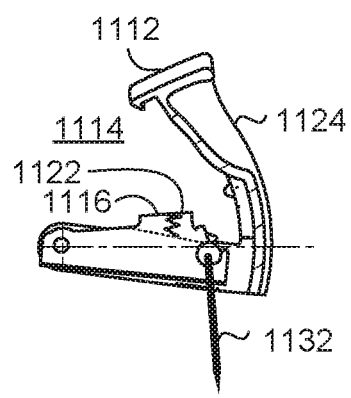
Figure 11G:
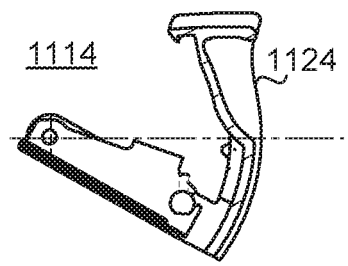

Assume now that the latch applies a force F_cable 1132 to the linkage 1116, for example as shown in FIG. 11F. The F_cable 1132 applies in a state 1110. The relationships between the forces can be such that $$F_{cable} > F_{handle} + F_{linkage} + \text{losses},$$

where losses represents loss of force within the system 1114 (e.g., due to friction between components). It follows that the F_customer 1128 applied by the user should satisfy the relationship that $$F_{customer} > F_{linkage} + F_{cable} + \text{losses} - F_{handle}.$$

In the state 1112, the system 1114 is latched. For example, the state 1112 can be considered the same state as the state 1100. The flag 1124 is not presented in the state 1112, for example because the flag 1124 is hidden within a housing.

The handle system 1114 is an example of a vehicle latch system wherein a spring (e.g., the spring 1122) is a compression spring positioned so as to bias a handle (e.g., the handle 1112) and a linkage (e.g., the linkage 1116) apart from each other. In some implementations, the system 1114 can have another type of spring (e.g., a leaf spring and/or a torsion spring) instead of, or in addition to, a compression spring.

The handle 1112 can serve to actuate the latch (e.g., by the user pulling on the handle 1112), so as to unlock the latch. The handle 1112 can serve to present a flag (e.g., the flag 1124), integrated with the handle 1112, when the handle 1112 is in an extended position (e.g., the position in the states 1104 through 1110). The handle 1112 can serve to hide the flag 1124 when the handle 1112 is in the retracted position (e.g., the position in the states 1100 and 1112).

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A vehicle latch system comprising:
   a housing at a first edge of a movable vehicle seatback, the housing having a handle configured to assume at least an extended position outside the housing in which a flag on the handle is presented, and a retracted position inside the housing in which the flag is not presented, the housing further having a cam for the handle and a linkage;
   a latch configured for placement at a second edge of the movable vehicle seatback, the second edge opposite the first edge;
   a cable connected to the linkage, the cable connecting the handle and the latch to each other; and
   a spring that biases the handle toward the retracted position.

2. The vehicle latch system of claim 1, wherein the handle has a profile that is essentially rectangular.

3. The vehicle latch system of claim 2, wherein a grip is formed in a first long side of the profile.

4. The vehicle latch system of claim 3, wherein the flag is integrated into a second long side of the profile opposite the first long side.

5. The vehicle latch system of claim 3, wherein the grip is formed by a top of the handle covering a hollow portion.

6. The vehicle latch system of claim 1, further comprising a spring that biases the handle toward the extended position.

7. The vehicle latch system of claim 6, configured to have at least latched, opening, open, and latching states.

8. The vehicle latch system of claim 7, wherein the handle assumes the extended position in the open and latching states.

9. The vehicle latch system of claim 8, wherein the handle assumes the retracted position in the latched and opening states.

10. The vehicle latch system of claim 8, wherein in the open state the latch causes the cable to slacken and the spring biases the handle into the extended position so as to present the flag.

11. The vehicle latch system of claim 1, wherein the cam is configured to lock the handle in the extended position, and wherein the linkage is configured to disengage the cam for transitioning the handle into the retracted position.

12. The vehicle latch system of claim 1, wherein the linkage includes a pin configured for engagement with a slot formed in the handle.

13. The vehicle latch system of claim 1, wherein the spring is a compression spring positioned so as to bias the handle and the linkage apart from each other.

14. The vehicle latch system of claim 1, further comprising a spring-loaded cam configured to lock the handle in the extended position.

15. A vehicle seat comprising:
a movable vehicle seatback; and
a latch system for the movable vehicle seatback, the latch system comprising:
a housing at a first edge of the movable vehicle seatback, the housing having a handle configured to assume at least an extended position outside the housing in which a flag on the handle is presented, and a retracted position inside the housing in which the flag is not presented, the housing further having a cam for the handle and a linkage;
a latch at a second edge of the movable vehicle seatback, the second edge opposite the first edge;
a cable connected to the linkage, the cable connecting the handle and the latch to each other; and
a spring that biases the handle toward the retracted position.

16. The vehicle seat of claim 15, further comprising a bracket on the movable vehicle seatback, the housing or the latch of the latch system mounted to the bracket.

17. The vehicle seat of claim 16, wherein the movable vehicle seatback includes first and second panels connected by welding stitches in a welding stitching pattern, each welding stitch of the welding stitching pattern accessible from a common direction.

18. The vehicle seat of claim 17, wherein the bracket is connected to the first or second panel by at least one of the welding stitches of the welding stitching pattern.

* * * * *